(12) United States Patent
Staley et al.

(10) Patent No.: US 9,643,302 B2
(45) Date of Patent: May 9, 2017

(54) PRE-TENSIONING TOOL FOR AN ENGINE TENSIONER

(71) Applicant: GM GLOBAL TECHNOLOGY OPERATIONS LLC, Detroit, MI (US)

(72) Inventors: Eric D Staley, Flushing, MI (US); Mark Stabinsky, Troy, MI (US); Patrick J. Tow, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 14/876,893

(22) Filed: Oct. 7, 2015

(65) Prior Publication Data

US 2017/0100823 A1  Apr. 13, 2017

(51) Int. Cl.
  F16H 7/10     (2006.01)
  F16H 7/22     (2006.01)
  F16H 7/12     (2006.01)
  B25B 25/00    (2006.01)
  F16H 7/08     (2006.01)
  B25B 27/00    (2006.01)

(52) U.S. Cl.
  CPC .......... B25B 25/00 (2013.01); B25B 27/0035 (2013.01); F16H 7/08 (2013.01)

(58) Field of Classification Search
  CPC .... F16H 2007/081; F16H 7/1281; F16H 7/24; F16H 2007/0846; F16H 2007/0878
  USPC ................. 474/130, 112, 120, 135
  See application file for complete search history.

(56) References Cited

U.S. PATENT DOCUMENTS

| 4,832,665 A * | 5/1989 | Kadota ................. F16H 7/1227 474/112 |
| 5,607,247 A * | 3/1997 | Lauritano ............... B25B 27/00 403/11 |
| 5,919,107 A * | 7/1999 | Stepniak ............... F16H 7/1281 474/112 |
| 6,422,962 B1* | 7/2002 | Lehtovaara ........... F16H 7/1236 474/101 |
| 6,659,896 B1* | 12/2003 | Stief ..................... F16H 7/1281 474/112 |
| 6,689,002 B1* | 2/2004 | Hascoat ................ F16H 7/1281 474/133 |
| 7,247,110 B2* | 7/2007 | Winninger ................ F16H 7/24 474/130 |
| 7,285,065 B2* | 10/2007 | Dinca ................... F16H 7/1281 474/112 |

(Continued)

*Primary Examiner* — Henry Liu
(74) *Attorney, Agent, or Firm* — Quinn IP Law (57) ABSTRACT

A multi-axis tool for pre-tensioning a camshaft-drive element tensioner in an engine includes a housing having first and second faces and a length. The housing defines a first passage arranged along a first axis and a second passage arranged along a second axis. The second axis is parallel to the first axis and each passage extends through the length of the housing. The tool also includes a first lug arranged on and extending beyond the first face. The first passage extends through the first lug. The tool also includes a second lug extending beyond the second face and arranged along a third axis that is parallel to the first axis. An indicator rod is arranged partially within the second passage and configured to selectively extend beyond the first face. An elastic element is arranged inside the second passage and configured to extend the indicator rod beyond the first face.

20 Claims, 6 Drawing Sheets

(56) References Cited

U.S. PATENT DOCUMENTS

| | | | | |
|---|---|---|---|---|
| 7,611,431 B2* | 11/2009 | Dinca | .................... | F16H 7/1281 |
| | | | | 474/112 |
| 7,637,829 B2* | 12/2009 | Stone | .................... | F16H 7/1281 |
| | | | | 474/109 |
| 7,850,560 B2* | 12/2010 | Arneth | .................. | F16H 7/1218 |
| | | | | 474/112 |
| 7,874,950 B2* | 1/2011 | Lehtovaara | ........... | F16H 7/1281 |
| | | | | 474/112 |
| 8,167,749 B2* | 5/2012 | Miyamoto | ................ | F16H 7/24 |
| | | | | 474/117 |
| 8,403,784 B2* | 3/2013 | Conneely | .................. | F16H 7/24 |
| | | | | 474/130 |
| 9,458,915 B2* | 10/2016 | Benz | ........................ | F16H 7/12 |
| 2003/0017894 A1* | 1/2003 | Kaiser | .................. | F16H 7/1218 |
| | | | | 474/112 |
| 2004/0180745 A1* | 9/2004 | Dinca | .................. | F16H 7/1281 |
| | | | | 474/135 |
| 2005/0170923 A1* | 8/2005 | Hodjat | ...................... | F16H 7/24 |
| | | | | 474/130 |
| 2005/0221933 A1* | 10/2005 | Shaw | ........................ | F16H 7/24 |
| | | | | 474/130 |
| 2005/0221934 A1* | 10/2005 | Shaw | ........................ | F16H 7/24 |
| | | | | 474/130 |
| 2008/0026894 A1* | 1/2008 | Dinca | .................. | F16H 7/1281 |
| | | | | 474/112 |
| 2008/0176687 A1* | 7/2008 | Schever | ................ | F16H 7/1281 |
| | | | | 474/135 |
| 2008/0302217 A1* | 12/2008 | Meissner | ................ | B25B 25/00 |
| | | | | 81/324 |
| 2010/0069186 A1* | 3/2010 | Conneely | .................. | F16H 7/24 |
| | | | | 474/130 |

* cited by examiner

PRE-TENSIONING TOOL FOR AN ENGINE TENSIONER

TECHNICAL FIELD

The present disclosure relates to a tool for pre-tensioning of a tensioner in an internal combustion engine.

BACKGROUND

An internal combustion engine typically employs camshaft(s) to open and close the engine's valves in order to control a supply of intake of air to the cylinder for combustion therein and removal of post-combustion gas therefrom. A camshaft-drive element, such as a timing belt or a timing chain, is frequently used to synchronize the rotation of an engine's crankshaft and camshaft(s) so that the engine's valves open and close at proper times during each cylinder's intake and exhaust strokes.

A timing belt usually includes teeth on the surface that contacts camshaft and crankshaft sprockets, while a timing chain typically includes rolling elements for contact with such sprockets. In certain engine designs, the timing belt or chain is also employed to maintain safe running clearance between the engine's valves and pistons. Additionally, in some engine designs the timing belt may be used to drive other engine components, such as a water and/or oil pump.

A tensioner is frequently used in an engine with either the timing belt or chain. Such a tensioner generally applies a force to the timing belt or chain to maintain the belt or chain in tension and, therefore, the rotational timing between the engine's crankshaft and camshaft(s). The tensioner ensures that, independent of the motion of the belt or chain, the connection between the engine's crankshaft and camshaft(s) remains intact, while limiting stress on the related components.

SUMMARY

One embodiment of the disclosure is directed to a multi-axis tool for pre-tensioning a camshaft-drive element tensioner in an internal combustion engine. The tool includes a housing having a first face, a second face, and a length defining a span between the first and second faces. The housing defines a first passage arranged along a first axis and a second passage arranged along a second axis. The second axis is parallel to the first axis and each passage extends through the length of the housing. The tool also includes a first lug arranged on and extending beyond the first face. The first passage extends through the first lug. The tool also includes a second lug arranged on and extending beyond the second face, and arranged along a third axis that is parallel to the first axis. An indicator rod is arranged partially within the second passage and is configured to selectively extend beyond the first face. An elastic element is arranged inside the second passage and configured to extend the indicator rod beyond the first face.

The elastic element may be a coil spring, the indicator rod may include a ledge, and the coil spring may be configured to seat against the ledge and preload the indicator rod toward the first face.

The multi-axis tool may also include a plate fixed, such as via a fastener(s), to the housing at the second face. The plate may thus be configured to retain the coil spring inside the second passage such that the coil spring preloads the indicator rod toward the first face.

The tensioner may include a tensioner body and a rotatable arm. The second lug may be configured to engage the rotatable arm of the tensioner.

The tensioner may include a first indicator feature arranged on the tensioner body and a second indicator feature arranged on the rotatable arm. A relative position of the first and second indicator features may be configured to indicate a tensioning state of the tensioner. The indicator rod may be configured to engage and align the first and second indicator features by extending therethrough, when the rod is extended beyond the first face by the spring.

The tensioner may include a fastener configured to fix the tensioner in position on the engine. The first passage may provide operative access to the fastener.

The fastener may include a fastener head. The housing may define a cavity aligned with the first passage and configured to provide clearance for the fastener head.

The first lug may include an external hex shape configured to be engaged by a complementary hex socket for rotating the housing and the second lug about the first axis.

The indicator rod may include a handle section extending beyond the second face. The handle section may be configured to facilitate retraction of the indicator rod into the second passage by compressing the elastic element.

The engine may include a timing cover defining an access opening for the multi-axis tool. The housing may be configured to fit into the access opening and engage the tensioner via the second lug.

Another embodiment of the present disclosure is directed to a method of pre-tensioning a camshaft-drive element tensioner using the multi-axis tool described above. The multi-axis tool may be operated via a multi-axis nut runner as part of an automated process for assembling the engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
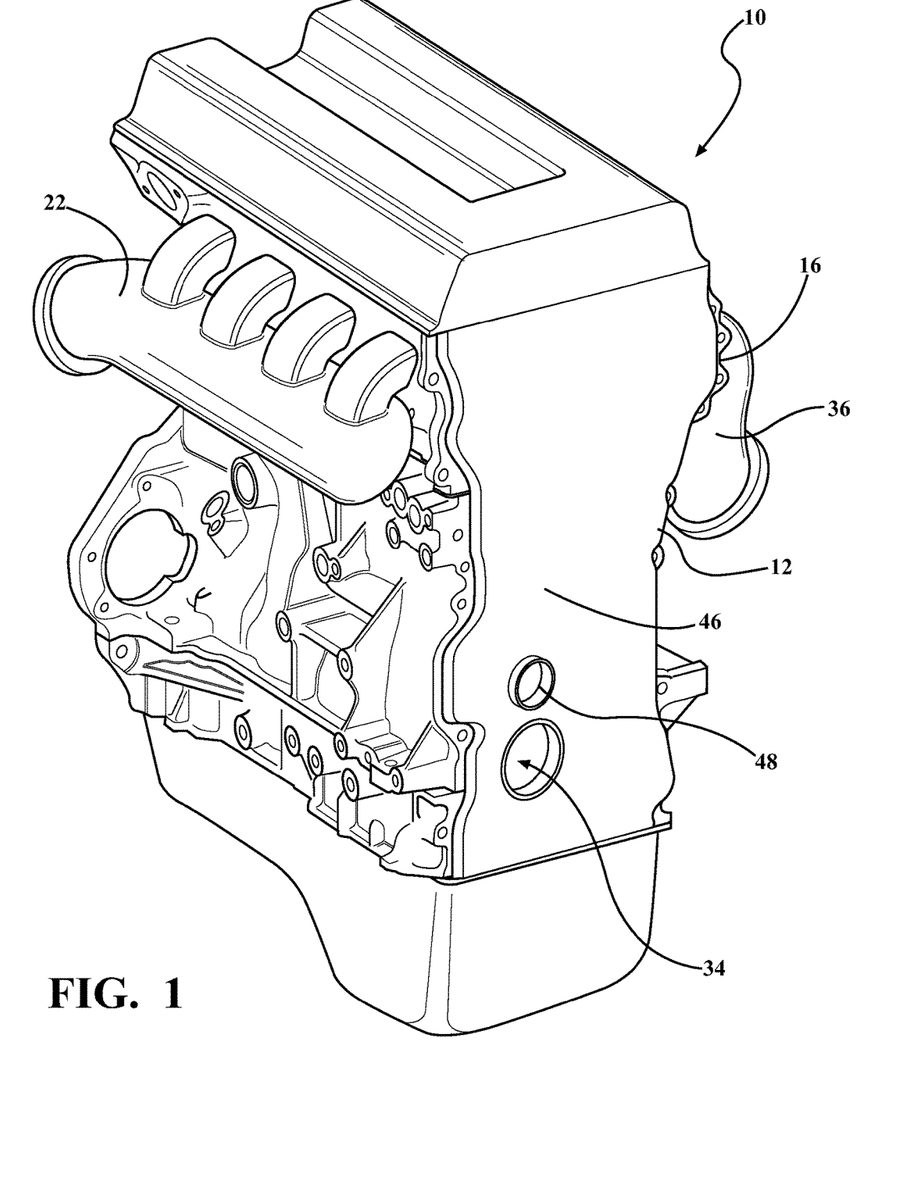
FIG. 1 is a schematic perspective view of an internal combustion engine.
Figure 2:
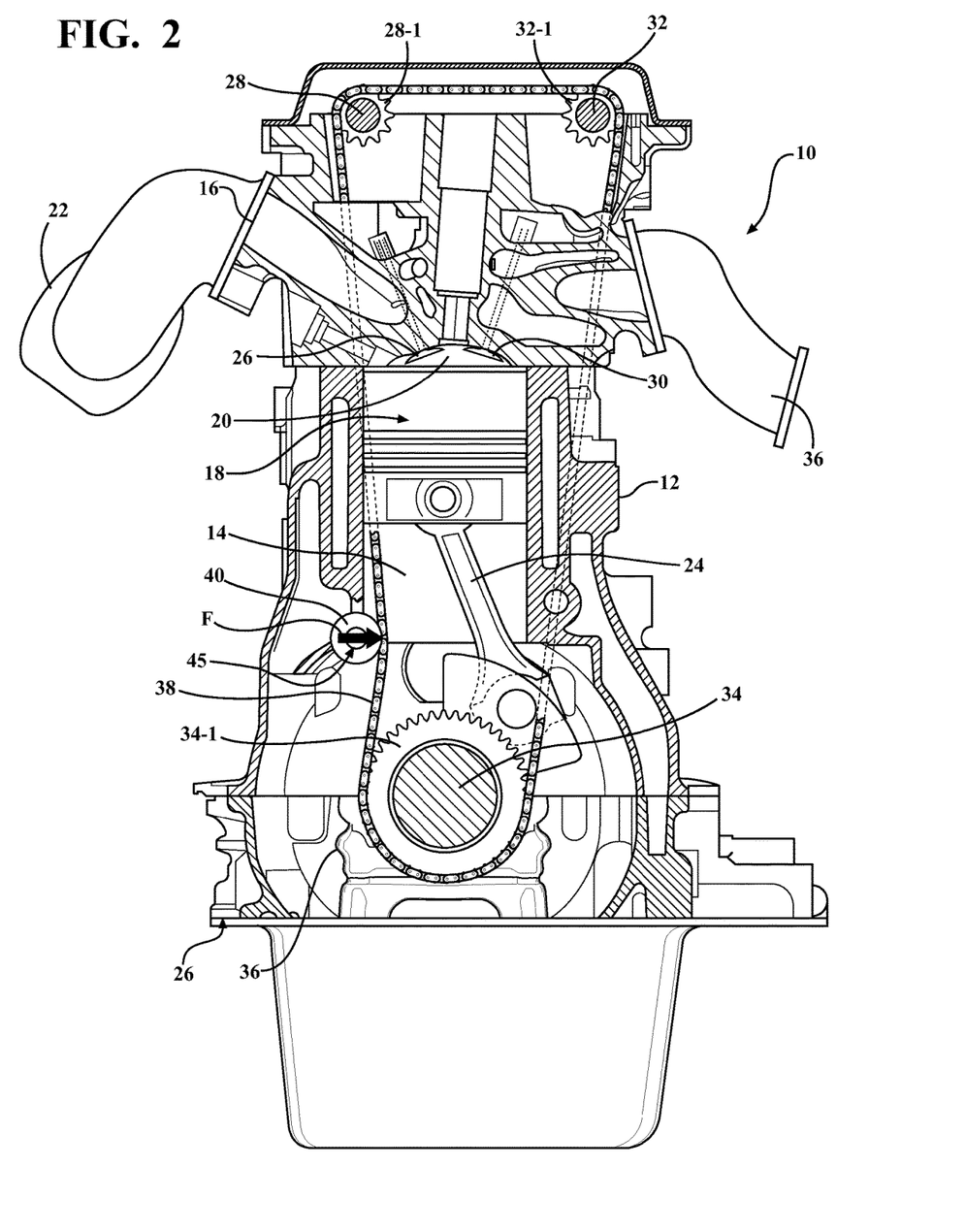
FIG. 2 is a schematic partially cross-sectional front view of the internal combustion engine shown in FIG. 1; the engine having a camshaft, a crankshaft, a camshaft-drive element, and a camshaft-drive element tensioner according to the disclosure.

Referring to the drawings, wherein like reference numbers correspond to like or similar components throughout the several figures, FIG. 1 illustrates an internal combustion engine 10, such as a spark- or compression-ignition type, typically used for propulsion of a vehicle (not shown). As shown in FIGS. 1 and 2, the engine 10 includes a cylinder block 12 with a plurality of cylinders 14 arranged therein and a cylinder head 16 that is mounted on the cylinder block. In the alternative, the cylinder head 16 may be integrated into or cast together with the cylinder block 12 (not shown).

The cylinder head 16 receives air and fuel as a pre-combustion charge to be used inside the cylinders 14 for subsequent combustion. As can be seen in FIG. 2, each cylinder 14 includes a respective piston 18 configured to reciprocate therein. Additionally, combustion chambers 20 are formed within the cylinders 14 between the bottom surface of the cylinder head 16 and the tops of the pistons 18. An airflow is directed through an intake manifold 22 to each of the combustion chambers 20 where fuel is combined with air and to form a fuel-air mixture for subsequent combustion inside the subject combustion chamber. Although an in-line four-cylinder engine is shown in FIGS. 1-2, nothing precludes the present disclosure from being applied to an engine having a different number and/or arrangement of cylinders.

As shown on FIG. 2, the engine 10 also includes a plurality of intake valves 26 operatively connected to the cylinder head 16 and configured to control a supply of air to each cylinder 14 for combustion with fuel therein. An intake camshaft 28 is configured to regulate opening and closing of the respective intake valves 26 during operation of the engine 10. The engine 10 additionally includes a plurality of exhaust valves 30 operatively connected to the cylinder head 16 and configured to control removal of post-combustion gasses from each cylinder 14. An exhaust camshaft 32 is configured to regulate opening and closing of the respective exhaust valves 30 during operation of the engine 10.

The engine 10 also includes a crankshaft 34 configured to rotate within the cylinder block 12. As known to those skilled in the art, the crankshaft 34 is rotated by the pistons 18 via connecting rods 24 as a result of an appropriately proportioned of fuel and air being selectively admitted into the combustion chambers 20 via one or more intake valves 26 and burned in the combustion chambers. After the air-fuel mixture is burned inside a specific combustion chamber 20, the reciprocating motion of a particular piston 18 serves to exhaust post-combustion gasses from the respective cylinder 14 via one or more exhaust valves 30. The cylinder head 16 is also configured to exhaust post-combustion gasses from the combustion chambers 20, such as via an exhaust manifold 36.

The intake and exhaust camshafts 28, 32 include respective sprockets 28-1, 32-1, while the crankshaft 34 includes a sprocket 34-1. The engine 10 also includes a camshaft-drive element 38, such as a timing belt (not shown) or a chain (as shown in FIG. 2). The camshaft-drive element 38 operatively connects the respective sprockets 28-1, 32-1, and 34-1 to thereby synchronize rotation of the crankshaft 34 and camshafts 28, 32. As understood by those skilled in the art, synchronized rotation of engine's crankshaft 34 and camshafts 28, 32 via the camshaft-drive element 38 ensures that the valves 26, 30 open and close at proper times during each cylinder's intake and exhaust strokes and may additionally maintain safe running clearance between the valves and pistons 18.

The engine 10 additionally includes a camshaft-drive element tensioner 40. The tensioner 40 is configured, i.e., constructed and arranged, to apply a force F to the camshaft-drive element 38 to maintain predetermined tension in the subject camshaft-drive element and, therefore, the rotational timing between the crankshaft 34 and camshafts 28, 32. The force F is intended to be continuously applied by the tensioner 40 to ensure that, independent of the motion of the camshaft-drive element 38, the connection and synchronized operation between the crankshaft 34 and camshafts 28, 32 remains intact. Typically, the tensioner 40 must be adjusted, i.e., pre-tensioned, on the engine 10 to provide appropriate magnitude of the force F whenever at least new sprockets 28-1, 32-1, and/or 34-1, a new camshaft-drive element 38, and/or a new tensioner 40 are installed on the engine.

Figure 4:
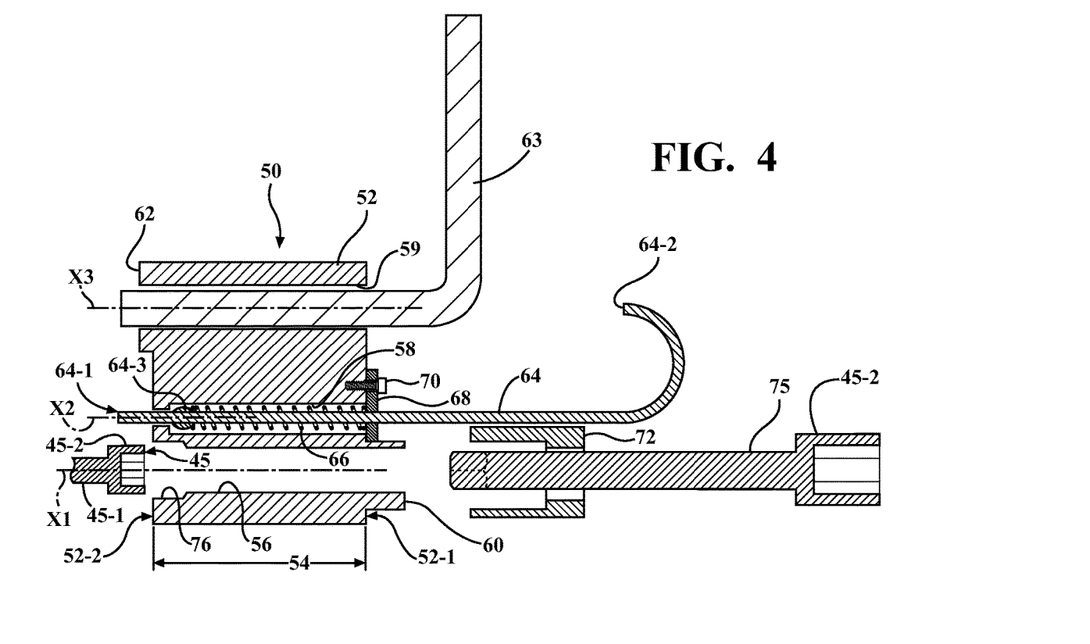
FIG. 4 is a schematic cross-sectional side view of the multi-axis tool shown in FIG. 3.
Figure 5:
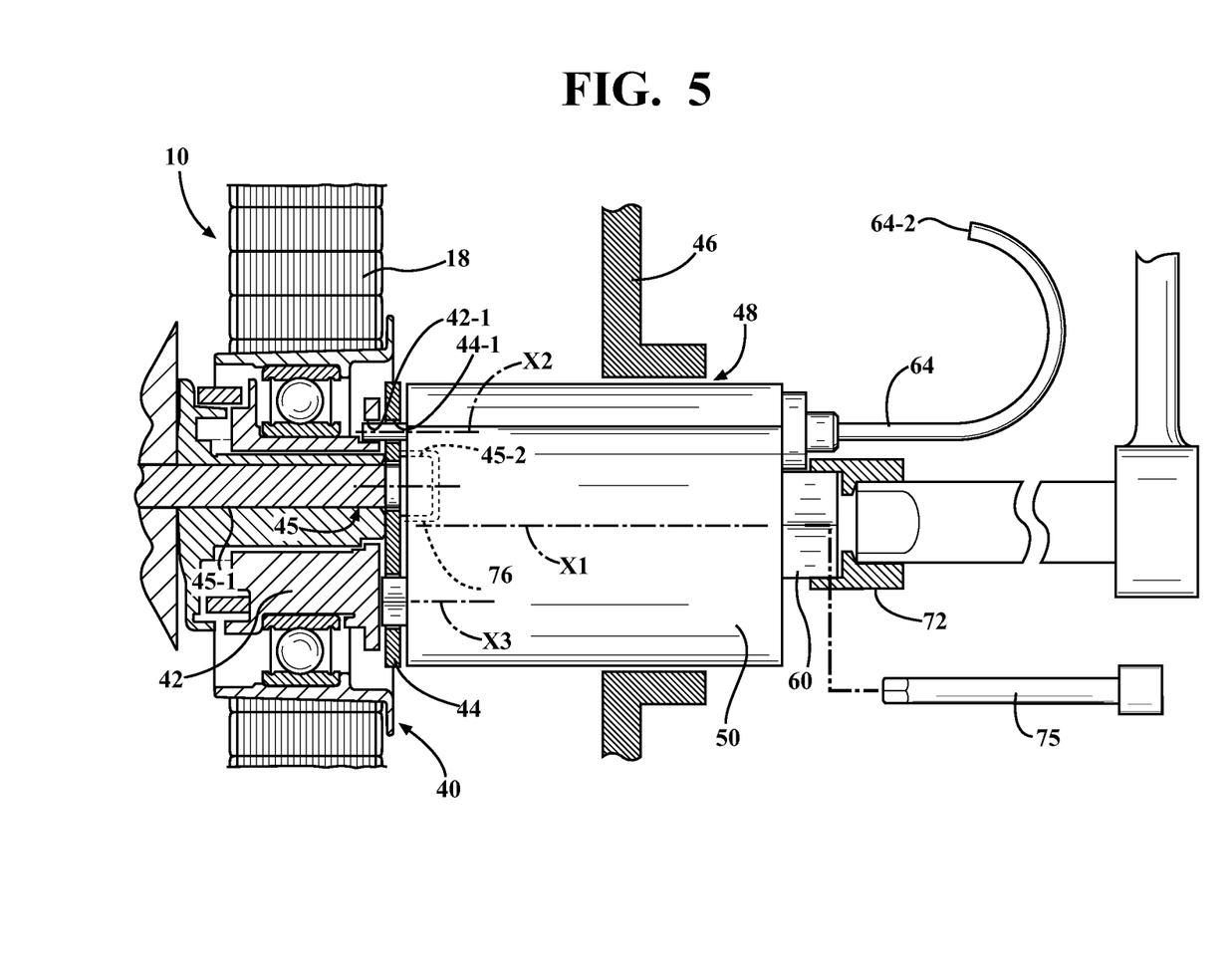
FIG. 5 is a schematic partial side view of the engine, shown in FIGS. 1-2, along with a schematic side view of the camshaft-drive element tensioner, shown in FIGS. 3-4, being engaged with the camshaft-drive element tensioner for manual pre-tensioning thereof according to one embodiment of the disclosure.
Figure 6:
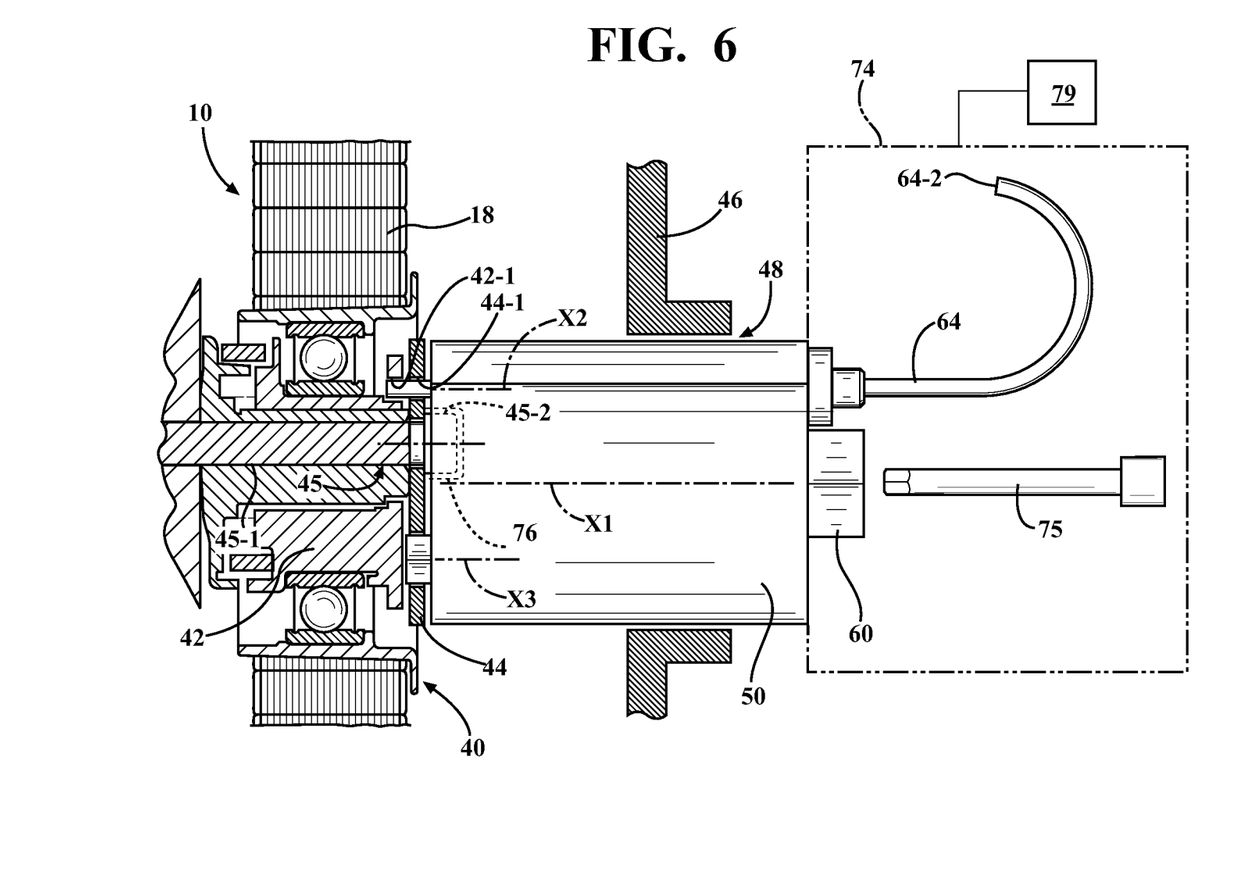
FIG. 6 is a schematic partial side view of the engine, shown in FIGS. 1-2, along with a schematic side view of the camshaft-drive element tensioner, shown in FIGS. 3-4, being engaged with the camshaft-drive element tensioner for automatic pre-tensioning thereof using a multi-axis tool according to another embodiment of the disclosure.

As shown in FIGS. 5-6, the tensioner 40 may include a tensioner body 42 and a rotatable arm 44. A first indicator feature 42-1 is arranged on the tensioner body 42 and a second indicator feature 44-1 arranged on the rotatable arm 44. Each of the first and second indicator features 42-1, 44-1 may be configured as apertures (shown in FIGS. 5-6) or indents (not shown) in the tensioner body 42 and the rotatable arm 44, respectively. A relative position of the first and second indicator features 42-1, 44-1 is configured to indicate the force F being generated by the tensioner 40, i.e., the pre-tensioning state of the tensioner. As shown in FIGS. 2 and 4-6, a fastener 45 can be employed to fix the tensioner 40 in position on the engine 10, either to the cylinder block 12 or to the cylinder head 16. With resumed reference to FIGS. 1-2, the engine 10 also includes a timing cover 46 (shown in FIG. 1) configured to shield the camshaft-drive element 38 and sprockets 28-1, 32-1, and 34-1 (shown in FIG. 2) from debris and interference with various external engine and vehicle components. The timing cover 46 defines an opening 48 for access to the tensioner 40, primarily for adjustment thereof during initial assembly and/or service of the engine 10.

Figure 3:
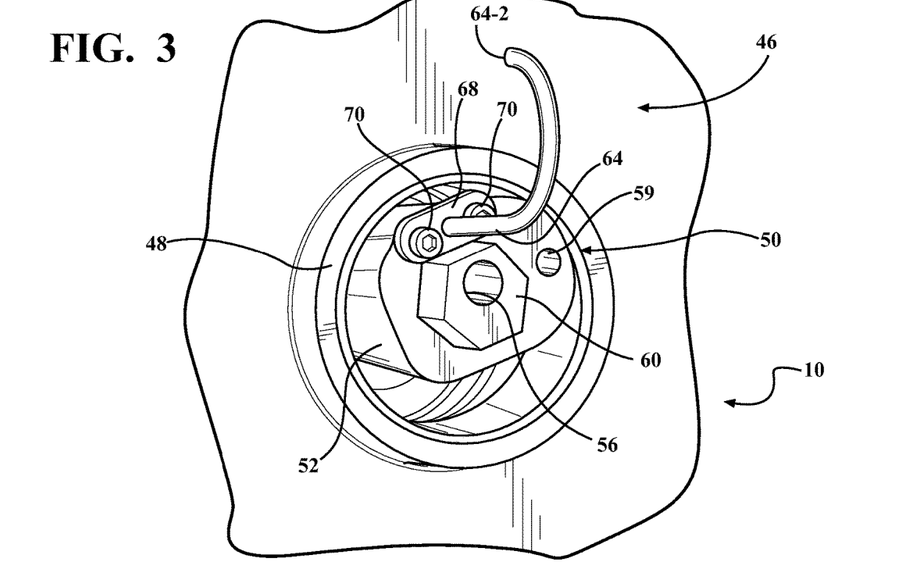
FIG. 3 is a schematic perspective view of a multi-axis tool inserted into a front cover of the engine shown in FIG. 1.

As indicated above, whenever new sprockets 28-1, 32-1, and/or 34-1, a new camshaft-drive element 38, and/or a new tensioner 40 are installed on the engine 10, the tensioner 40 must be pre-tensioned. A multi-axis tool 50, shown in FIGS. 3 and 4, is provided to facilitate effective adjustment of the tensioner 40 for such situations. The multi-axis tool 50 includes a housing 52. The housing 52 has a first face 52-1, a second face 52-2, and a length 54 defining by a span between the first and second faces. The housing 52 defines a first passage 56 arranged along a first axis X1 and a second passage 58 arranged along a second axis X2. The housing 52 is configured such that the second axis X2 is parallel to the first axis X1 and each passage 56, 58 extends through the length 54. The housing 52 also includes a first lug 60 arranged on and extending or projecting beyond the first face 52-1. The first passage 56 extends through the first lug 60. The housing 52 also includes a second lug 62 arranged on and extending beyond the second face 52-2. Additionally, the second lug 62 is arranged along a third axis X3 that is parallel to the first axis X1. A passage 59 is arranged along the third axis X3 and provides clearance for a tool 63, such as a hex driver, that can be used to turn the second lug 62 and rotate the tensioner arm 44. Such rotation of the tensioner arm 44 serves to shift the tensioner 40 into the camshaft-drive element 38 to thereby pretension the camshaft-drive element.

An indicator rod 64 is arranged partially within the second passage 58 and partially outside the housing 52. The indicator rod 64 includes a first end 64-1, and also includes a distal second end 64-2 that extends beyond the second face 52-2 and may be shaped as a handle section. An elastic element 66 is arranged inside the second passage 58 and configured to preload the indicator rod 64 to selectively extend the first end 64-1 beyond the first face 52-1. As shown, the second end 64-2 shaped as a handle section is configured to facilitate retraction of the indicator rod 64 into the second passage 58 by compressing the elastic element 66. The elastic element 66 may be a coil spring. The indicator rod 64 may include a ledge 64-3, which may be configured as a pinched section in the indicator rod. The elastic element 66 configured as a coil spring may seat against and apply a force to the ledge 64-3 in order to preload the first end 64-1 toward and beyond the first face 52-1. The retraction of the indicator rod 64 into the second passage 58 may be accomplished by a specifically-trained individual, when pre-tensioning is performed manually (shown in FIG. 5), or via a machine, as part of an automated engine assembly process (shown in FIG. 6).

As shown in FIGS. 3-4, the multi-axis tool 50 may also include a plate 68 fixed to the housing 52. The plate 68 is configured to retain the elastic element 66 inside the second passage 58 to thereby facilitate preloading of the indicator rod 64 toward the first face 52-1. The plate 68 may be fastened to the housing 52 via any known means, such as one or more catches (not shown) and/or screws 70, at the second face 52-2. The housing 52 is configured to fit into the access opening 48 of the timing cover 46 and engage the tensioner 40 via the second lug 62, following the tensioner having been loosely attached to the engine 10 via a pre-started fastener 45. Specifically, the second lug 62 engages the rotatable arm 44 of the tensioner. The housing 52 can then be rotated via the first lug 60. The first lug 60 may include an external hex shape 60-1 configured to be engaged by a complementary hex socket 72 for rotating the housing 52 and the second lug 62 about the first axis X1. The hex socket 72 may be used with a wrench configured for manual rotation of the housing 52 via the first lug 60, or with a specifically adapted device, such as a multi-axis nut runner 74 (schematically shown in FIG. 6), as part of an automated process for assembling the engine 10.

Following the rotation of housing 52 via the first lug 60, the indicator rod 64 can be extended beyond the first face 52-1 to engage both the first and second indicator features 42-1, 44-1 (shown in FIG. 5), and thereby affect their respective alignment. As described above, extension of the indicator rod 64 is generated via the action of elastic element 66, which ensures the indicator rod's reliable engagement with the indicator features 42-1, 44-1. Once the first and second indicator features 42-1, 44-1 have been aligned via the engagement of indicator rod 64 therewith, the fastener 45 may be tightened to specified torque for generating the required tensioning force F via the tensioner 40 to the camshaft-drive element 38. Such tightening of the fastener 45 may be accomplished either manually by a human operator, or as part of an automated engine assembly process via the multi-axis nut runner 74. As can be seen in FIG. 3, the first passage 56 may provide operative access to the fastener 45, for example via an extension tool or adapter 75, for tightening the fastener 45 in order to fix the tensioner 40 in pre-tensioned position on the engine 10. The fastener 45 generally includes a fastener body, such as a shank 45-1, and may also include a fastener head 45-2. Additionally, the housing 52 may define a cavity 76 aligned with the first passage 56. The cavity 76 provides clearance for the fastener head 45-2 when the second lug 62 of the multi-axis tool 50 is aligned with the rotatable arm 44.

Figure 7:
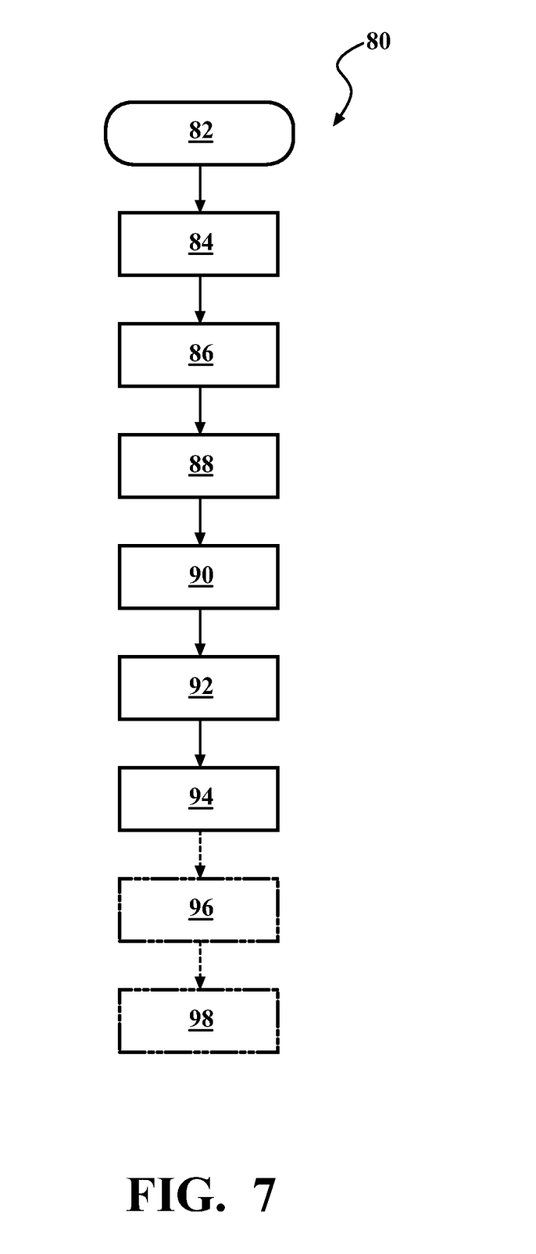
FIG. 7 schematically illustrates, in flow chart format, a method of pre-tensioning the camshaft-drive element tensioner via the multi-axis tool shown in FIGS. 1-6.

FIG. 7 depicts a method 80 of pre-tensioning the camshaft-drive element tensioner 40 in the internal combustion engine 10, as described above with respect to FIGS. 1-6. As shown in FIG. 5, method 80 can be performed manually, by a specially trained operator, during servicing or repair of the engine 10. Method 80 can likewise be performed during an automated engine assembly process via the multiple-axis nut runner 74 regulated by an electronic controller 79 specifically programmed for the operation, as shown in FIG. 6. Method 80 commences in frame 82 with the engine 10 being partially assembled, wherein the intake and exhaust camshafts 28, 32, crankshaft 34, sprockets 28-1, 32-1, 34-1, and the camshaft-drive element 38 are positioned with respect to the cylinder block 12 and the cylinder head 16. From frame 82 the method advances to frame 84. In frame 84 the method includes pre-starting the fastener 45 to operatively connect the camshaft-drive element tensioner 40 to the engine 10. Following frame 84 the method proceeds to frame 86. In frame 86 the method includes providing the multi-axis tool 50 for engagement with the tensioner 40.

Following frame 86, the method advances to frame 88, where the method includes engaging the second lug 62 of the multi-axis tool 50 with the rotatable arm 44 of the tensioner 40. The method then advances to frame 90, where the method includes rotating the housing 52 via the first lug 60 such that the second lug 62 is rotated about the first axis X1 and thereby rotates the rotatable arm 44. From frame 90 the method advances to frame 92. In frame 92 the method includes aligning the first and second indicator features 42-1, 44-1 via the indicator rod 64 being extended beyond the first face 52-1. After frame 92, the method proceeds to frame 94, where the method includes fixing the tensioner 40 in position on the engine 10 by tightening the fastener 45 to specification torque. Following frame 94, the method may proceed to frame 96, where the method may include retracting the indicator rod 64 into the second passage 58 by compressing the elastic element 66. After the indicator rod 64 has been retracted into the second passage 58, the method may proceed to frame 98, where the second lug 62 is disengaged from the rotatable arm 44 and the multi-axis tool 50 is removed from the engine 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A multi-axis tool for pre-tensioning a camshaft-drive element tensioner in an internal combustion engine, the tool comprising:

a housing having a first face, a second face, and a length defining a span between the first and second faces, wherein the housing defines a first passage arranged along a first axis and a second passage arranged along a second axis, and wherein the second axis is parallel to the first axis and each of the first and second passages extends through the length of the housing;

a first lug arranged on and extending beyond the first face, wherein the first passage extends through the first lug;

a second lug arranged on and extending beyond the second face and arranged along a third axis that is parallel to the first axis;

an indicator rod arranged partially within the second passage and configured to selectively extend beyond the first face; and an elastic element arranged inside the second passage and configured to extend the indicator rod beyond the first face.

2. The multi-axis tool according to claim 1, wherein:
the elastic element is a coil spring;
the indicator rod includes a ledge; and
the coil spring is configured to seat against the ledge and preload the indicator rod toward the first face.

3. The multi-axis tool according to claim 2, further comprising a plate fixed to the housing at the second face and configured to retain the coil spring inside the second passage.

4. The multi-axis tool according to claim 1, wherein the tensioner includes a tensioner body and a rotatable arm, and wherein the second lug is configured to engage the rotatable arm of the tensioner.

5. The multi-axis tool according to claim 4, wherein:
the tensioner includes a first indicator feature arranged on the tensioner body and a second indicator feature arranged on the rotatable arm;
a relative position of the first and second indicator features is configured to indicate a tensioning state of the tensioner; and
the indicator rod is configured to engage and align the first and second indicator features when extended beyond the first face by the spring to engage both indicator features.

6. The multi-axis tool according to claim 1, wherein the tensioner includes a fastener configured to fix the tensioner in position on the engine, and wherein the first passage provides operative access to the fastener.

7. The multi-axis tool according to claim 6, wherein the fastener includes a fastener head, and wherein the housing defines a cavity aligned with the first passage and configured to provide clearance for the fastener head.

8. The multi-axis tool according to claim 1, wherein the first lug includes an external hex shape configured to be engaged by a complementary hex socket for rotating the housing and the second lug about the first axis.

9. The multi-axis tool according to claim 1, wherein the indicator rod includes a handle section extending beyond the second face, and wherein the handle section is configured to facilitate retraction of the indicator rod into the second passage by compressing the elastic element.

10. The multi-axis tool according to claim 1, wherein the engine includes a timing cover defining an access opening for the multi-axis tool, and wherein the housing is configured to fit into the access opening and engage the tensioner via the second lug.

11. A method of pre-tensioning a camshaft-drive element tensioner, the method comprising:

providing an internal combustion engine having a camshaft, and a camshaft-drive element;

pre-starting a fastener to operatively connect the camshaft-drive element tensioner to the engine, wherein the tensioner includes:
a tensioner body configured to contact the camshaft-drive element;
a rotatable arm configured to load the tensioner against the camshaft-drive element; and
a first indicator feature arranged on the tensioner body and a second indicator feature arranged on the rotatable arm, such that a relative position of the first and second indicator features is configured to indicate a tensioning state of the tensioner;

providing a multi-axis tool for engagement with the camshaft-drive element tensioner, wherein the multi-axis tool includes:
a housing having a first face, a second face, and a length defining a span between the first and second faces, wherein the housing defines a first passage arranged along a first axis and a second passage arranged along a second axis, and wherein the second axis is parallel to the first axis and each of the first and second passages extends through the length of the housing;
a first lug arranged on and extending beyond the first face, wherein the first passage extends through the first lug;
a second lug arranged on and extending beyond the second face and arranged along a third axis that is parallel to the first axis;
an indicator rod arranged partially within the second passage and configured to selectively extend beyond the first face; and
an elastic element arranged inside the second passage and configured to extend the indicator rod beyond the first face;

engaging the second lug of the multi-axis tool with the rotatable arm of the tensioner;

rotating the housing via the first lug such that the second lug is rotated about the first axis and thereby rotates the rotatable arm;

aligning the first and second indicator features via the indicator rod being extended beyond the first face by the elastic element; and fixing the tensioner in position on the engine by tightening the fastener to specification torque.

12. The method according to claim 11, wherein:
the elastic element is a coil spring;
the indicator rod includes a ledge; and
said engaging and aligning the first and second indicator features includes seating the coil spring against the ledge and preloading the indicator rod toward the first face.

13. The method according to claim 12, further comprising a plate fixed to the housing at the second face, and wherein said preloading the indicator rod toward the first face includes retaining the coil spring inside the second passage via the plate.

14. The method according to claim 11, wherein:
the tensioner includes a first indicator feature arranged on the tensioner body and a second indicator feature arranged on the rotatable arm; and
said aligning the first and second indicator features via the indicator rod includes extending the indicator rod through and engaging both the first and second indicator features.

15. The method according to claim 11, wherein:
the tensioner includes a fastener configured to fix the tensioner in position on the engine;
the first passage provides operative access to the fastener; and
said tightening the fastener to specification torque includes accessing the fastener through the first passage.

16. The method according to claim 11, wherein:
the fastener includes a fastener head;
the housing defines a cavity aligned with the first passage and configured to provide clearance for the fastener head; and
said engaging the second lug of the multi-axis tool with the rotatable arm of the tensioner includes aligning the clearance in the housing with the fastener head.

17. The method according to claim 11, wherein the first lug includes an external hex shape and the multi-axis tool includes a complementary hex socket, and wherein said rotating the housing via the first lug includes engaging the external hex shape with the hex socket.

18. The method according to claim 11, wherein the indicator rod includes a handle section extending beyond the second face, further comprising retracting the indicator rod into the second passage by compressing the elastic element following said fixing the tensioner in position on the engine.

19. The method according to claim 18, wherein following said retracting the indicator rod into the second passage, the method includes disengaging the second lug of the multi-axis tool from the rotatable arm of the tensioner and removing the multi-axis tool from the engine.

20. The method according to claim 11, wherein the engine includes a timing cover defining an access opening for the multi-axis tool, and wherein said engaging the second lug of the multi-axis tool with the rotatable arm of the tensioner includes fitting the multi-axis tool into the access opening.

* * * * *